Patented Jan. 13, 1948

2,434,578

UNITED STATES PATENT OFFICE 2,434,578

ANTIKNOCK MOTOR FUEL

Pharis Miller, Mountainside, N. J., assignor to Standard Oil Development Company, a corporation of Delaware No Drawing. Application May 5, 1945,
Serial No. 592,275

7 Claims. (Cl. 44—67)

This invention relates to the art of improving anti-knock characteristics of a motor fuel for high-compression, spark-ignition engines by additives which are highly effective in very small amounts for suppressing knocking.

An object of this invention is to provide highly effective metal-containing anti-knock additives which have satisfactory solubility, volatility, and stability.

Iron- and nickel-carbonyls have been known to be very effective anti-knock agents, but they are known to be attacked and decomposed easily by heat, light, and moisture. Also, other metals have been found to possess knock suppressing effectiveness, but it has been difficult to determine metal-containing compounds that can be safely handled, that remain stably dissolved in the fuel, and can be properly carburetted with the fuel to furnish effective concentrations of the metal within the combustion zones of spark-fired internal combustion engines.

Stable complex compounds considered to be useful anti-knock agents in accordance with the present invention are characterized as follows: (1) They contain a metal constituent capable of suppressing fuel knock in a spark-ignition engine, (2) the metal constituent is bonded to one or more electro-negative atoms or radicals, such as a halogen or halogenoid; (3) the metal constituent is also linked in complete co-ordination to molecular groups, e. g., carbon monoxide, ammonia, amine, organic nitrogen base, or metal oxide molecules. A general formula representing these stable complex compounds is:

wherein M represents the central metal constituent, X is the electronegative constituent taken $x$ times to satisfy an ordinary valency of the metal, and $(N)_n$ represents molecules having a co-ordinate linkage to the metal, $n$ being the number of these molecules, which can exist independently as neutral molecules. The atoms and molecules inside the bracket are regarded as being entirely non-ionizable.

Metals known to be capable of forming stable complexes are mainly the heavy metals, i. e., metals having specific gravities greater than 4, which are capable of forming double salts, are mainly amphoteric, and have more than one valence. These heavy metals are in groups I, IV, VI, VII, and VIII of the periodic system, as, for example, copper, thorium, lead, chromium, manganese, iron, nickel, cobalt, rhodium, and related metals having similar complex-forming and knock-suppressing properties.

Complex compounds of the type desired for use as anti-knock agents may be formed readily from halide salts of the metals. The higher atomic weight halogens, such as bromine or iodine, or a halogenoid, such as a cyanide radical, may be used in place of chlorine.

Some of the stable complexes are made in the absence of water, and for others, traces of water or alcohol vapor are essential. Complexes may also be formed by combining the metal halides with an amine or with ammonia molecules followed by absorption of carbon monoxide.

The preferred stable complexes contain coordinated molecules having basic characteristics, in addition to the halogen or electronegative atoms and co-ordinated neutral carbon monoxide molecules. This type is exemplified by complexes containing an oxide of the metal, an ammonia (NH₃) group, an amine, or another type of nitrogen base, in addition to the halogen and carbon monoxide linked to the metal constituent.

The kinds of reactions which occur are illustrated by the formations of stable complexes of copper. Cupric iodide forms a stable co-ordination complex with an amine, as, for example:

Or, a copper halide, e. g. cuprous chloride, is converted into an ammino copper halide, e. g. CuCl·NH₃, which absorbs carbon monoxide to form stable complexes of the type:

wherein (CO) and (N') represent neutral molecular groups corresponding to $(N)_n$ in the general formula, (N') being base-forming molecules taken $b$ times, as, for example, in [ClCu(CO)(NH₃)].

In the preferred stable ammino halide complexes, the ammonia molecule may be replaced by amines or organic nitrogen bases, e. g., ethylene diamine, isobutylamine, pyridine, etc., and the number of molecules depends upon the co-ordination number of the central metal constituent, which is 4 for cupric copper and 6 for most of the other useful metals.

Metals having a co-ordination number of 6 in stable complexes, are illustrated by a series of compounds derived from ammino cobalt halides, in which cobalt in the cobaltic state appears to be more stable and in which base-forming (ammino) groups are partly replaced by carbon monoxide, as in [Br₃Co(CO)(C₅H₅N)₂].

The described type of complexes are highly stable and have suitable solubility in gasoline. Such small concentrations as only about 0.1% by weight of these compounds dissolved in a gasoline fed to a spark-ignition engine increase the anti-knock value of the fuel by 3 to 6 octane numbers.

A stable complex halide containing carbon monoxide with an inorganic basic molecule is specifically illustrated by a complex of rhodium which has been represented by the molecular compound formula RhCl₂.RhO.3CO, or Cl₂.Rh(CO)₃RhO and also by the formula RhCl₂.Rh.3CO. This complex is obtained by passing CO over rhodium chloride. At 140° C., hydrated rhodium chloride, RhCl₃.H₂O, and CO form the characteristic red crystals of the complex which melt at 125° C., and are sublimed unchanged. It decomposes at 300° C. It is more stable to heat, water, and light for general handling than is Ni(CO)₄ or Fe(CO)₅. This complex is readily dissolved in xylol, 1 g. dissolving in 50 cc. of xylol without difficulty. The relatively low vapor pressure of the solid complex makes it less toxic and easier to keep than the simple metal carbonyls.

The following data are presented to show the effectiveness of the complex rhodium chloride compound dissolved in a gasoline motor fuel: A xylol solution of the complex rhodium chloride, RCl₂.RhO.3CO, containing 1 g. of this compound in 50 cc. of xylol, was added to one liter of a 65 A. S. T. M. octane number gasoline reference fuel. This blend contained less than one gram of the complex in the reference fuel with 5% of the added xylene, and gave the following engine test results:

|  | Octane Rating | |
| --- | --- | --- |
|  | A. S. T. M. | C. F. R. Research |
| Base Blend (Ref. Fuel+5% Xylene) | 66.0 | 70.1 |
| Base Blend+1 g. [RhCl₂.Rho.3CO] | 69.5 | 75.0 |
| Increase in Octane Number | 3.5 | 4.9 |
| Blending Value | 2,630 | 4,500 |

It is readily apparent that the number of stable complexes is quite extensive, even though at this stage in their development a relatively small number of them have been of practical significance. It is also to be noted that the metals involved in the complexes are known to have different individual tendencies, as, for example, copper and cobalt appear to be most capable of forming stable ammino halide complexes; iron has particular ability to form cyanide complexes; nickel to form complexes with glyoximes, etc. Also, the halogens and molecular groups vary in their effects on stabilizing the complexes, but as a general rule, the higher atomic weight halogens and progressive replacements of carbon monoxide by base-forming molecules tend to decrease photo-sensitivity of the complexes.

The preferred stable complexes are substantially insoluble in water, have low melting points, and volatilize without decomposition. As a general rule, the valency of the electro-negative (acido) radicals in these complexes are numerically equal to the normal valency of the central metal constituent, so that the complex is nullvalent and inert.

The stable complex anti-knock agents herein described are to be blended with gasoline type fuels in concentrations of about 0.01% to about 0.5% by weight to obtain substantial increases in the octane numbers of the fuels.

As illustrated, the stable complex compounds of the type described are some of the most effective anti-knock agents that have been discovered. They are indicated to have particularly high research blending values, which are of chief importance for their effects under actual operating conditions. It is also indicated that these stable complexes are particularly useful in their high effectiveness with aromatic hydrocarbon fuel ingredients.

The stable complex anti-knock agents may be used singly or in mixtures. They may be used to supplement metallo-organic anti-knock agents. They may be added to a fuel with other fuel blending agents, such as gum fluxes, corrosion inhibitors, anti-oxidants, color stabilizers, thickeners, lubricants, etc. They may be used in various refined motor fuel products, including straight run gasoline, cracked gasoline, polymer gasoline, alkylate, and with various anti-knock fuel blending compounds, such as alcohols, esters, amines, branched ethers, and the like.

The present invention comprises a motor fuel to which has been added a small amount of a metal halide complex containing two different metals. This broad concept of the invention comprises several different modifications, for instance, one in which the complex contains two different metal halides, as represented by the following general formula:

$$M'X_x.M''Y_y.(N')_n$$

where M′ and M″ are different complex-forming metals, X and Y are halogens, x and y are integers representing ordinary valencies of M′ and M″ respectively, and (N′)ₙ represents neutral molecules having coordinate linkages to the metal constituents. The metals M′ and M″ may be any of the metals listed earlier in the specification, or may be others such as platinum, osmium, rhenium, tin, palladium, iridium, etc. X and Y may be any of the halogens, fluorine, chlorine, bromine and iodine; and the several X atoms may be alike or different and the several Y atoms may be alike or different. Although the neutral molecules (N′)ₙ which are connected by coordinate linkages to the metal atoms, may be selected from the group consisting of carbon monoxide, nitrogen bases and metal oxides, they may also be NO groups or CN groups, although these latter two groups are not considered as satisfactory as the previous three classes; CO is particularly preferred. Specific examples of anti-knock agents coming within this modification of the invention are listed herewith:

FeCl₂.SnCl₂.(CO)₄, which may be also written

Fe(CO)₄Cl₂SnCl₂

Fe(CO)₄.Hg₂Cl₂

[Cd₂X]Fe(CO)₄ where X=NH₃ or pyridine, etc., and derivatives of the acid

H[PtX₃,CO]

where X=Cl, Br, or I or SCN, as

K[COPt(SCN)₃]

and

K₃[CO(CN)₅Co]

potassium carbonyl cobalt cyanide.

Another modification of the invention comprises metal halide complexes containing two different metals but only one metal halide, in conjunction with neutral molecules connected to the metal atom by coordinate linkages, as is shown in the following general formula: M'X$_x$.M''.(N')$_n$, in which these various letters have the same meaning or definition as in the last-mentioned general formula. Samples of materials coming within this modification of the invention include:

$$Fe(CO)_4.SnCl_4$$
$$Fe(CO)_4SnCl_2$$
$$Fe(CO)_4Cl_2.SbCl_3$$
$$Fe(CO)_4SOCl_2$$
$$[(CO)_4Co]_2[Ni(NH_3)_6]$$
$$[(CO)_4Co]Ag.\tfrac{1}{2}CO.\tfrac{1}{2}H_2O$$
$$Fe(CO)_5.Hg(OAc)_2$$

A still further modification of the invention comprises metal halide complexes containing one metal in the form of a metal halide and containing another metal in the form of a metal oxide, and also containing neutral molecules linked to the metal by coordinate linkages, as illustrated in the following general formula: M'X$_x$.Z.(N')$_n$ in which Z represents an oxide of a metal different than M', and the other letters have the same meanings as described in the two previous general formulas.

It is noted that the last three mentioned general formulas may all be grouped within the following general formula: M'X$_x$.Z'.(N')$_n$, in which Z' is selected from the class consisting of metal, metal oxide, and metal halide, the metal being different from the metal atom M', the other letters in the formula having the same meaning as in the previously referred to general formulas.

It is not intended that this invention be limited to the specific examples which have been given merely for the sake of illustration, but only by the appended claims in which it is intended to claim all novelty inherent in the invention as well as all modifications coming within the scope and spirit of the invention.

What is claimed is:
1. An anti-knock motor fuel consisting essentially of a gasoline fuel containing a small amount of a stable complex having the formula

$$M'X_x.M''Y_y.(N')_n$$

wherein M' and M'' represent different central heavy metal constituents selected from groups I, IV, VI, VII and VIII of the periodic table, X and Y are halogen atoms taken $x$ and $y$ times to satisfy ordinary valences of M' and M'', respectively, and (N')$_n$ represents molecules selected from the group consisting of carbon monoxide, NO, CN, nitrogen bases and an oxide of said metals having coordinate linkages to the metal constituents, and $n$ represents a number of such molecules corresponding to an available coordination valence of said metals.

2. Motor fuel according to claim 1 in which M' is tin.
3. Fuel according to claim 1 in which M'X$_x$ is a tin chloride.
4. Fuel according to claim 1 in which M'X$_x$ is SnCl$_2$.
5. Fuel according to claim 1 in which N' is a CO group.
6. Fuel according to claim 1 in which X and Y are both chlorine and N' is a CO group.
7. A motor fuel consisting essentially of a gasoline base stock containing dissolved therein an octane number-increasing amount of $$Fe(CO)_4Cl_2SnCl_2.$$

PHARIS MILLER.

REFERENCES CITED

The following references are of record in the file of this patent:

UNITED STATES PATENTS

| Number | Name | Date |
| --- | --- | --- |
| 2,375,236 | Miller | May 8, 1945 |

OTHER REFERENCES

Chemical Abstracts, vol. 37 (1943), page 3685.